US012803383B2

(12) United States Patent
Zhou

(10) Patent No.: US 12,803,383 B2
(45) Date of Patent: Nov. 17, 2026

(54) HEAT DISSIPATION MECHANISM FOR COLD DRINK DISPENSER AND COLD DRINK DISPENSER

(71) Applicant: Guangzhou Xin'an Trading Co., Ltd., Guangzhou (CN)

(72) Inventor: Quan Zhou, Guangzhou (CN)

(73) Assignee: Guangzhou Xin'an Trading Co., Ltd., Guangzhou (CN)

( * ) Notice: Subject to any disclaimer, the term of this patent is extended or adjusted under 35 U.S.C. 154(b) by 116 days.

(21) Appl. No.: 19/017,804

(22) Filed: Jan. 13, 2025

(65) Prior Publication Data

US 2026/0074592 A1 Mar. 12, 2026

(30) Foreign Application Priority Data

Sep. 6, 2024 (CN) ........................ 202422201150.0

(51) Int. Cl.
*H02K 9/08* (2006.01)
*A47J 31/44* (2006.01)
*H02K 9/06* (2006.01)

(52) U.S. Cl.
CPC ............ *H02K 9/08* (2013.01); *A47J 31/4403* (2013.01); *H02K 9/06* (2013.01); *H02K 2209/00* (2013.01)

(58) Field of Classification Search
CPC ........ H02K 9/08; H02K 9/06; H02K 2209/00; A47J 31/4403
USPC ........................................................ 165/138
See application file for complete search history.

(56) References Cited

U.S. PATENT DOCUMENTS

2022/0239193 A1 * 7/2022 Byaliy .................. F02B 63/042

FOREIGN PATENT DOCUMENTS

CN 106943013 A * 7/2017 .............. F24F 13/28
CN 109199107 A * 1/2019 .............. A47J 31/00
CN 115137208 A * 10/2022 ............ A47J 31/468

* cited by examiner

*Primary Examiner* — Steve S Tanenbaum

(57) ABSTRACT

The present application discloses a novel heat dissipation mechanism for a beverage cooler and the beverage cooler itself. The heat dissipation mechanism comprises a driving heat dissipation box and a heat dissipation ventilation panel. The heat dissipation ventilation panel is provided with a driving heat dissipation area and a refrigerating heat dissipation area in a spaced-apart manner, wherein the driving heat dissipation area covers over the motor base of the beverage cooler, and the driving heat dissipation box is installed in the motor base; the driving heat dissipation area comprises a driving motor heat dissipation area and a driving board heat dissipation area, with the driving motor heat dissipation area being arranged in correspondence with a motor heat dissipation fan in the motor base; By adopting the present application, heat-generating areas of the beverage cooler can be cooled, achieving excellent heat dissipation effects.

10 Claims, 5 Drawing Sheets

HEAT DISSIPATION MECHANISM FOR COLD DRINK DISPENSER AND COLD DRINK DISPENSER

CROSS REFERENCE TO RELATED APPLICATIONS

The present application claims the benefit of Chinese Patent Application No. 202422201150.0 filed on Sep. 6, 2024, the contents of which are incorporated herein by reference in their entirety.

TECHNICAL FIELD

The disclosure relates to the technical field of heat dissipation devices, particularly to a heat dissipation mechanism for a cold drink dispenser and the cold drink dispenser.

BACKGROUND

The current cold drink dispenser includes a main unit cover, inside which a cooling circulation device (comprising components such as a compressor and the cold drink dispenser itself) is provided. A material tank is provided on the main unit cover, with the evaporator of the cooling circulation device located inside the material tank. Additionally, a mixing device and a motor drive unit for driving the mixing device to rotate are provided within the material tank, and a dispensing faucet is provided on the front side wall of the material tank. The left, right, and rear sides of the main unit cover are provided with heat dissipation plates, which contain multiple heat dissipation holes, allowing for heat dissipation from the heating components inside the main unit cover through these three heat dissipation plates.

However, the installation of numerous heat dissipation ventilation covers complicates the heat dissipation structure, making it easy for external impurities and moisture to enter the main unit cover, affecting the internal electrical components and wiring, and reducing device stability. Furthermore, there is no targeted heat dissipation for the heating components, resulting in low heat dissipation efficiency. At the same time, the aforementioned cold drink dispenser lacks a heat dissipation structure for the motor drive unit, which can lead to excessive heating of the motor drive unit, affecting its operation, and even potentially causing burnout of the motor drive unit after prolonged use.

Moreover, current motor drive boxes generally do not have corresponding heat dissipation structures and often rely on the remaining gaps around wiring holes for heat dissipation, which results in poor heat dissipation. When the drive board operates for an extended period, it can easily lead to higher internal temperatures within the drive box, thereby affecting the stable operation of the drive board. Additionally, excessively high temperatures may damage components on the drive board, further impacting the mixing function of the cold drink dispenser.

SUMMARY

The technical problem to be solved by the application is to provide a heat dissipation mechanism for a cold drink dispenser and the cold drink dispenser, which can effectively dissipate heat from the heating areas of the cold drink dispenser with excellent heat dissipation effects.

To address the aforementioned technical problem, the application presents a heat dissipation mechanism for a cold drink dispenser, comprising a drive heat dissipation box and a heat dissipation ventilation plate. The heat dissipation ventilation plate is provided covering an opening at one end of the cold drink dispenser. The heat dissipation ventilation plate comprises a drive heat dissipation area and a refrigeration heat dissipation area, which are spaced apart from each other. The drive heat dissipation area covers the motor base of the cold drink dispenser, with the drive heat dissipation box installed within the motor base. The drive heat dissipation area comprises a drive motor heat dissipation area and a drive board heat dissipation area. The drive motor heat dissipation area is positioned to correspond with a motor heat dissipation fan in the motor base, and the drive board heat dissipation area corresponds with the drive heat dissipation box. A drive board is provided inside the drive heat dissipation box. One end of the drive heat dissipation box is provided with wire-passing holes, and multiple ventilation holes are spaced apart on the drive heat dissipation box, with the ventilation holes located near the drive board heat dissipation area. The refrigeration heat dissipation area covers the refrigeration casing of the cold drink dispenser and corresponds with a condenser located within the refrigeration casing. A heat dissipation fan is provided inside the condenser.

As an improvement to the aforementioned solution, the inner wall of the drive motor heat dissipation area is provided with a first heat dissipation ventilation section, and multiple first heat dissipation holes are provided in the area of the drive motor heat dissipation area corresponding to the first heat dissipation ventilation section. The first heat dissipation ventilation section is positioned close to the motor heat dissipation fan and is provided with a first heat dissipation channel that communicates with the first heat dissipation holes.

As further improvement to the aforementioned solution, the drive board heat dissipation area is provided with multiple second heat dissipation holes arranged in a matrix, and the second heat dissipation holes communicate with the ventilation holes. As an improvement to the aforementioned scheme, the inner wall of the refrigeration and heat dissipation area is provided with a second heat dissipation ventilation section, and multiple third heat dissipation holes are arranged in the area of the refrigeration and heat dissipation area corresponding to the second heat dissipation ventilation section. The second heat dissipation ventilation section is relatively close to or in abutment with the condenser, and a second heat dissipation channel is provided inside the second heat dissipation ventilation section, which communicates with the third heat dissipation holes.

As an improvement to the aforementioned solution, the drive heat dissipation box comprises a drive box body and a cover covering the drive box body, which together enclose a drive cavity. The two sides of one end of the drive cavity are respectively provided with the wire passage holes, and multiple ventilation holes are spaced apart on the cover, communicating with the drive cavity. The cover and the ventilation holes are arranged opposite to the drive board.

As an improvement to the aforementioned solution, the ventilation holes are arranged in a matrix on the cover, with intervals between adjacent ventilation holes. The ventilation holes are shaped like an inverted L.

As an improvement to the aforementioned solution, multiple first elastic latching projections are respectively provided on the two side walls of the drive heat dissipation area, and first latching grooves are respectively provided on the two inner walls of the motor base. The first elastic latching projections engage with the first latching grooves.

As an improvement to the aforementioned solution, an installation notch is provided at the bottom of the refrigeration and heat dissipation area, which is installed on the bottom plate of the refrigeration casing. Positioning flanges are respectively provided on the two inner walls of the refrigeration and heat dissipation area, and positioning groove seats corresponding to the positioning flanges are respectively provided on the two inner walls of the installation opening of the refrigeration casing. The positioning flanges fit into the positioning groove seats. Multiple second elastic latching projections are spaced apart on the two side walls of the refrigeration and heat dissipation area, and flange portions are provided on the two inner walls of the installation opening of the refrigeration casing. The second elastic latching projections are used to abut against the flange portions and latch into the installation opening. Multiple first bolt installation holes are provided on the perimeter edge of the refrigeration and heat dissipation area, and first bolt installation portions corresponding to the first bolt installation holes are provided on the perimeter sidewalls of the installation opening.

As an improvement to the aforementioned scheme, the refrigeration and heat dissipation area is embedded in the installation groove of the refrigeration casing, and multiple second bolt installation holes are provided on the perimeter edge of the refrigeration and heat dissipation area. Second bolt installation portions corresponding to the second bolt installation holes are provided on the perimeter sidewalls of the installation opening.

The disclosure also provides a cold drink dispenser, which comprises the aforementioned heat dissipation mechanism.

The beneficial effects of implementing the disclosure are as follows.

The heat dissipation ventilation plate of the disclosure is provided with a drive dissipation area and a refrigeration heat dissipation area, which are paced at intervals. The drive dissipation area covers the motor base of the cold drink dispenser. The drive dissipation area comprises a drive motor heat dissipation area and a drive board heat dissipation area. The drive motor heat dissipation area is arranged opposite to the motor heat dissipation fan in the motor base, and the drive board heat dissipation area is arranged opposite to the drive heat dissipation box in the motor base. The refrigeration heat dissipation area covers the refrigeration casing of the cold drink dispenser and is arranged opposite to the condenser in the refrigeration casing. By setting corresponding heat dissipation areas in the corresponding regions of the heat dissipation ventilation plate, targeted heat dissipation can be achieved for the corresponding heat-generating areas, without the need for excessive heat dissipation covers. The heat dissipation structure is simple. Furthermore, it can reduce the probability of external impurities and moisture entering the interior of the cold drink dispenser, improve the operational stability of electrical components and wiring, and thus enhance the stability of the device.

Moreover, the disclosure provides multiple ventilation holes on the drive heat dissipation box, which are close to the drive board heat dissipation area. The ventilation holes can dissipate heat from the drive board in the drive heat dissipation box, achieving excellent heat dissipation effects and preventing the drive board from affecting its stable operation due to high operating temperatures. This ensures the stable operation of the mixing function of the cold drink dispenser.

DESCRIPTION OF EMBODIMENTS

To make the purpose, technical solutions, and advantages of the disclosure clearer, a further detailed description of the disclosure will be provided below in conjunction with the accompanying drawings.

Figure 1:
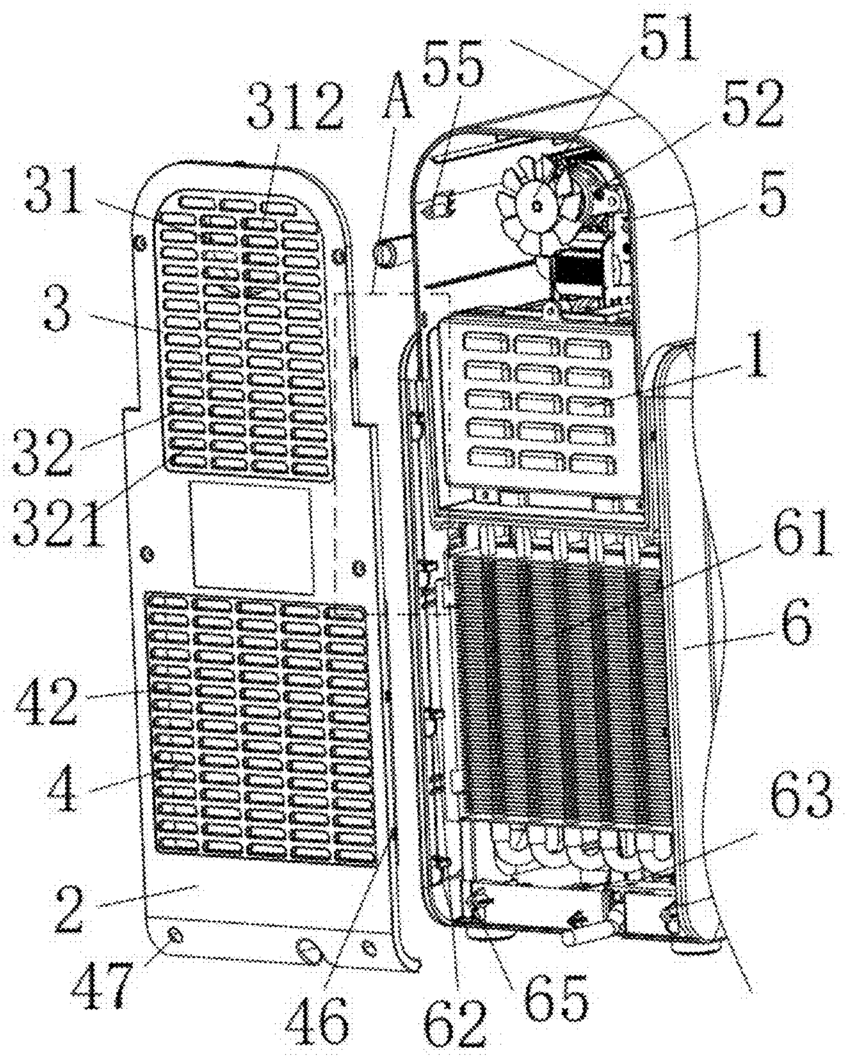
FIG. 1 is a structural diagram of the first embodiment of the heat dissipation mechanism of the disclosure.
Figure 2:
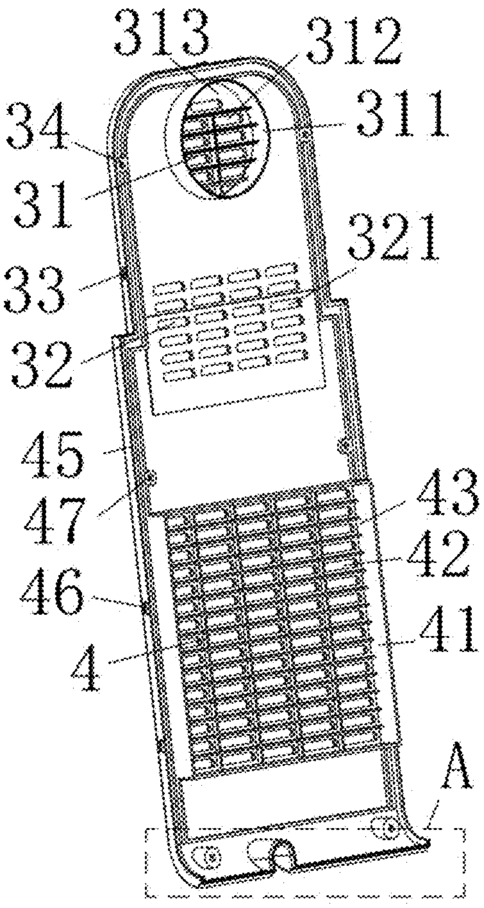
FIG. 2 is a structural diagram of the heat dissipation ventilation plate of the disclosure.

As shown in FIGS. 1 to 2, FIGS. 1 to 2 illustrate the first embodiment of the heat dissipation mechanism of the disclosure, which comprises a drive heat dissipation box 1 and a heat dissipation ventilation plate 2. The heat dissipation ventilation plate 2 covers an opening at one end of the cold drink dispenser. The heat dissipation ventilation plate 2 is provided with a drive heat dissipation area 3 and a refrigeration heat dissipation area 4 at intervals. The drive heat dissipation area 3 covers the motor base 5 of the cold drink dispenser, and the drive heat dissipation box 1 is installed in the motor base 5. The drive heat dissipation area 3 comprises a drive motor heat dissipation area 31 and a drive board heat dissipation area 32. The drive motor heat dissipation area 31 is arranged opposite to a motor heat dissipation fan 51 in the motor base 5 to dissipate heat from the hot air blown by the motor heat dissipation fan 51, achieving targeted heat dissipation for the motor device 52. The drive board heat dissipation area 32 is arranged opposite to the drive heat dissipation box 1 to dissipate heat emitted by the drive heat dissipation box 1, achieving targeted heat dissipation for the drive heat dissipation box 1. The refrigeration heat dissipation area 4 covers a refrigeration casing 6 of the cold drink dispenser. The refrigeration heat dissipation area 4 is arranged opposite to a condenser 61 in the refrigeration casing 6. A heat dissipation fan is provided inside the condenser 61 to send the heat emitted by the condenser 61 outwardly to the refrigeration heat dissipation area 4, achieving targeted heat dissipation for the condenser 61.

By setting corresponding heat dissipation areas in the corresponding regions of the heat dissipation ventilation plate 2, the disclosure provides targeted heat dissipation for the corresponding heat-generating areas without the need for excessive heat dissipation covers. The heat dissipation structure is simple and can also reduce the probability of external impurities and moisture entering the interior of the cold drink dispenser, improving the operational stability of electrical components and wiring and thus enhancing the stability of the device.

Among them, a drive board 11 is provided inside the drive heat dissipation box 1. One end of the drive heat dissipation box 1 is provided with a wire-passing hole 12. Multiple ventilation holes 13 are provided at intervals on the drive heat dissipation box 1, and the ventilation holes 13 are close to the drive board heat dissipation area 32. The heat inside the drive heat dissipation box 1 flows to the drive board heat dissipation area 32 through the ventilation holes 13 and is then discharged outwardly, achieving the heat dissipation function for the drive board 11.

The disclosure provides multiple ventilation holes 13 on the drive heat dissipation box 1, and the ventilation holes 13 are close to the drive board heat dissipation area 32. The ventilation holes 13 can dissipate heat from the drive board 11 in the drive heat dissipation box 1, providing excellent heat dissipation effects and preventing the drive board 11 from affecting its stable operation due to high operating temperatures, thus ensuring stable operation of the mixing function of the cold drink dispenser.

It should be noted that the main heat-generating components in the cold drink dispenser are generally the motor device 52, the drive heat dissipation box 1 for driving the motor device 52 to operate, and the condenser 61, etc. The disclosure mainly provides corresponding heat dissipation structures for the above-mentioned heat-generating components to achieve targeted heat dissipation and improve heat dissipation effects. Among them, the provided drive heat dissipation area 3 can cool the inner cavity of the motor base 5, and the provided refrigeration heat dissipation area 4 can cool the inner cavity of the refrigeration casing 6.

Specifically, the inner wall of the drive motor heat dissipation area 31 is provided with a first heat dissipation ventilation section 311, and multiple first heat dissipation holes 312 are provided in the region of the drive motor heat dissipation area 31 corresponding to the first heat dissipation ventilation section 311. The first heat dissipation ventilation section 311 is close to the motor heat dissipation fan 51, and the motor heat dissipation fan 51 is installed on the motor device 52. A first heat dissipation channel 313 is provided inside the first heat dissipation ventilation section 311, and the first heat dissipation channel 313 is connected to the first heat dissipation holes 312. When the motor heat dissipation fan 51 performs heat dissipation, the hot air extracted by it will be discharged outwardly through the first heat dissipation channel 313 and the second heat dissipation holes 321 to achieve targeted heat dissipation for the motor device 52 and improve the heat dissipation effect of the motor device 52.

To improve the heat dissipation effect of the motor device 52, at least a partial structure of the motor heat dissipation fan 51 is located in the first heat dissipation channel 313 so that all the hot air extracted by the motor heat dissipation fan 51 flows toward the first heat dissipation holes 312 through the first heat dissipation channel 313 to achieve outward heat dissipation and improve the heat dissipation effect of the motor device 52.

Preferably, the drive board heat dissipation area 32 is provided with multiple second heat dissipation holes 321 arranged in a matrix, and the second heat dissipation holes 321 are connected to the ventilation holes 13 and are arranged directly opposite the drive heat dissipation box 1. The second heat dissipation holes 321 arranged in a matrix are close to the drive heat dissipation box 1. The heat emitted through the ventilation holes 13 of the drive heat dissipation box 1 will be discharged outwardly through the corresponding second heat dissipation holes 321 to achieve targeted heat dissipation for the drive heat dissipation box 1.

To improve the heat dissipation effect of the condenser 61, the inner wall of the refrigeration heat dissipation area 4 is provided with a second heat dissipation ventilation section 41, and multiple third heat dissipation holes 42 are provided in the region of the refrigeration heat dissipation area 4 corresponding to the second heat dissipation ventilation section 41. The second heat dissipation ventilation section 41 is relatively close to or in contact with the condenser 61 so that most or all of the heat is directly discharged outwardly through the second heat dissipation ventilation section 41, improving the heat dissipation effect. A second heat dissipation channel 43 is provided inside the second heat dissipation ventilation section 41, and the second heat dissipation channel 43 is connected to the third heat dissipation holes 42. The heat emitted by the condenser 61 and the heat inside the inner cavity of the refrigeration casing 6 will be sent to the second heat dissipation channel 43 by the heat dissipation fan and then discharged outwardly through the third heat dissipation holes 42 to achieve targeted heat dissipation for the condenser 61 and the refrigeration casing 6.

Figure 3:
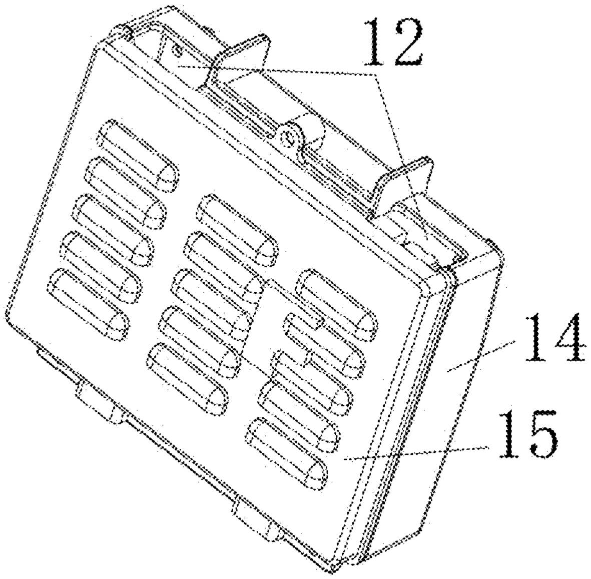
FIG. 3 is a structural diagram of the drive board heat dissipation mechanism of the disclosure.
Figure 4:
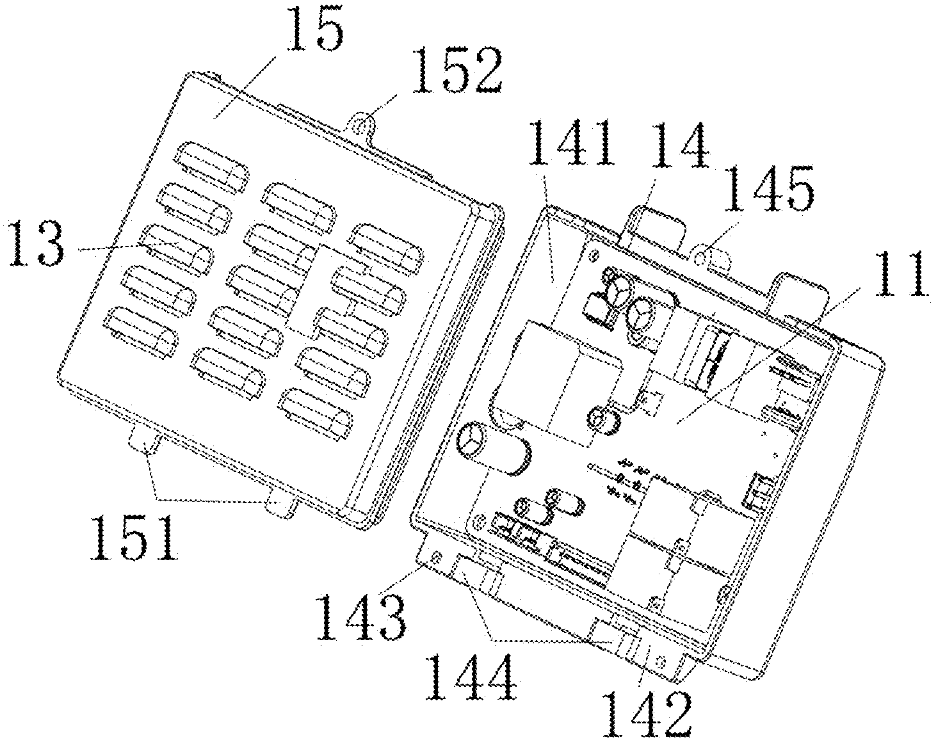
FIG. 4 is an exploded structural diagram of the drive board heat dissipation mechanism of the disclosure.

As shown in FIGS. 3 to 4, the drive heat dissipation box 1 comprises a drive box body 14 and a cover 15 covering the drive box body 14. A drive cavity 141 is enclosed between the drive box body 14 and the cover 15. Both sides of one end of the drive cavity 141 are respectively provided with the wire-passing holes 12, and the drive cavity 141 is connected to the external space through the wire-passing holes 12. That is, the wire-passing holes 12 enable the connection between the drive board 11 and external wiring, and the remaining gaps after the wires are passed through the wire-passing holes 12 can also serve as heat dissipation channels for the drive cavity 141, improving the heat dissipation effect of the drive cavity 141 and the drive board 11.

Multiple ventilation holes 13 are provided at intervals on the cover 15, and the ventilation holes 13 are connected to the drive cavity 141. The cover 15 and the ventilation holes 13 are arranged directly opposite the drive board 11 to more efficiently discharge the heat emitted by the drive board 11 outwardly to the drive board heat dissipation area 32 through the ventilation holes 13 and then discharge it outwardly through the drive board heat dissipation area 32, achieving efficient heat dissipation for the drive board 11.

Among them, the ventilation holes 13 are arranged on the cover 15 in a matrix, and there is a space between adjacent ventilation holes 13. The ventilation holes 13 arranged in a matrix are directly opposite the drive board 11 to discharge the heat emitted from each position of the drive board 11 outwardly through the ventilation holes 13 of this structure, improving heat dissipation efficiency and cooling effects.

To avoid external impurities easily entering the drive cavity 141, the ventilation holes 13 are in an inverted L-shape, and their air outlets are downward, effectively preventing external impurities from easily entering the drive cavity 141 horizontally and affecting the drive board 11.

Figure 5:
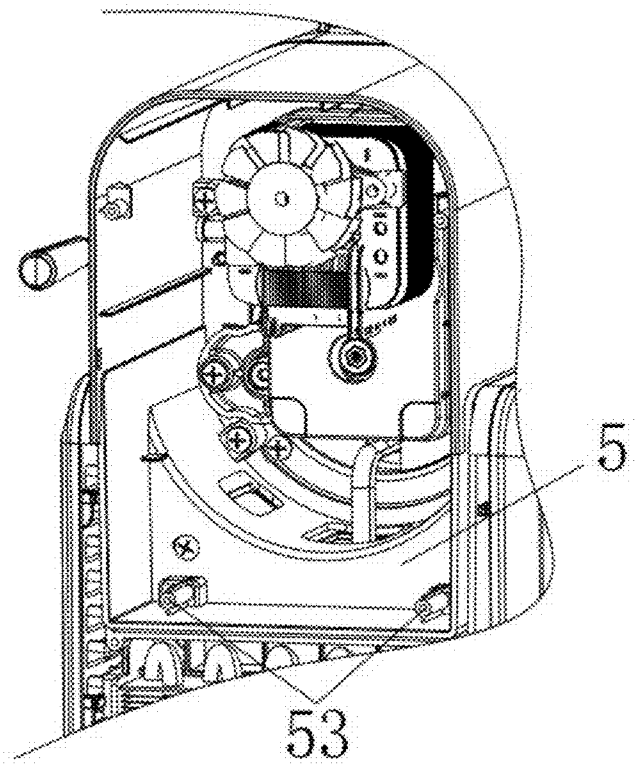
FIG. 5 is a structural diagram of the motor base of the disclosure.

In order to achieve the fixed installation of the drive housing 141, as shown in FIGS. 3 to 5, one end of the drive housing 14 is provided with an outwardly extending flange 142, and both sides of the flange 142 are respectively provided with fourth bolt installation holes 143; both sides of the bottom wall of the motor base 5 are respectively provided with installation portions 53 corresponding to the fourth bolt installation holes 143. During installation, the lower end face of the drive housing 14 abuts against the upper end face of the installation portions 53, and the rear end of the flange 142 abuts against the front end of the installation portions 53; bolts are passed through the bolt installation holes to be fixedly connected with the installation portions 53, thereby fixing the drive housing 14 in the motor base 5.

Preferably, both sides of one end of the cover body 15 are respectively provided with latching blocks 151, and the other end of the cover body 15 is provided with a fifth bolt installation hole 152; both sides of the flange 142 are respectively provided with latching grooves 144 corresponding to the latching blocks 151, and one end of the drive housing 14 away from the flange 142 is provided with a fifth bolt installation portion 145 corresponding and compatible with the fifth bolt installation hole 152. During installation, the latching blocks 151 of the cover body 15 are first latched into the latching grooves 144 to serve as a positioning function, and then bolts are passed through the fifth bolt installation hole 152 to be fixedly connected with the fifth bolt installation portion 145, thereby achieving a fixed connection between the cover body 15 and the drive housing 14.

Figure 6:
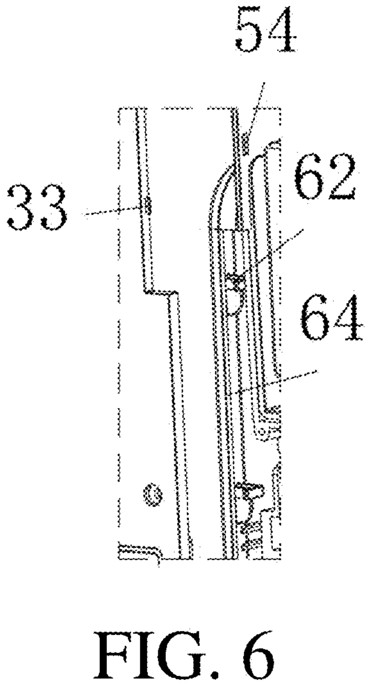
FIG. 6 is an enlarged structural diagram of part A in FIG. 1.

Furthermore, as shown in FIGS. 1 to 2 and FIG. 6, both side walls of the drive heat dissipation area 3 are respectively provided with first elastic latching portions 33, and both inner walls of the motor base 5 are respectively provided with first latching grooves 54, with the first elastic latching portions 33 latched with the first latching grooves 54 to achieve relative fixation between the drive heat dissipation area 3 and the motor base 5.

To improve the connection robustness between the drive heat dissipation area 3 and the motor base 5, as shown in FIGS. 1 to 2, the two side edges of the drive heat dissipation area 3 are provided with third bolt installation holes 34, and both inner walls of the motor base 5 are respectively provided with third bolt installation portions 55 corresponding to the third bolt installation holes 34. Bolts are passed through the third bolt installation holes 34 to be fixedly connected with the third bolt installation portions 55, thereby improving the connection robustness between the drive heat dissipation area 3 and the motor base 5.

Figure 7:
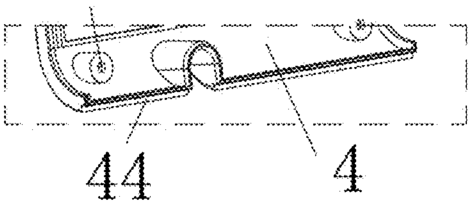
FIG. 7 is an enlarged structural diagram of part A in FIG. 2.

Furthermore, as shown in FIG. 2 and FIGS. 6 to 7, the bottom of the refrigeration heat dissipation area 4 is provided with an installation notch 44, which is installed on the bottom plate of the refrigeration casing 6 to serve as an installation positioning function. Both inner walls of the refrigeration heat dissipation area 4 are respectively provided with positioning flanges 45, and both inner walls of the installation opening 63 of the refrigeration casing 6 are respectively provided with positioning groove seats 62 corresponding to the positioning flanges 45, with the positioning flanges 45 adapted and connected with the positioning groove seats 62 to further serve as an installation positioning function.

Both sidewalls of the refrigeration heat dissipation area 4 are respectively provided with a plurality of second elastic latching portions 46 spaced apart, and both inner walls of the installation opening 63 of the refrigeration casing 6 are respectively provided with flange portions 64. When the refrigeration heat dissipation area 4 is inserted into the refrigeration casing 6, the two second elastic latching portions 46 of the refrigeration heat dissipation area 4 will first abut against the corresponding convex circular portions and, based on the elastic action, latch into the installation opening 63. At this time, the front end faces of the second elastic latching portions 46 abut against the inner end faces of the convex circular portions to serve as a latching fixation function.

To further improve the connection robustness between the refrigeration heat dissipation area 4 and the refrigeration casing 6, as shown in FIGS. 1 to 2, the periphery of the refrigeration heat dissipation area 4 is provided with a plurality of first bolt installation holes 47, and the peripheral side walls of the installation opening 63 are provided with first bolt installation portions 65 corresponding to the first bolt installation holes 47; bolts are passed through the first bolt installation holes 47 to be fixedly connected with the first bolt installation portions 65, thereby further improving the connection robustness between the refrigeration heat dissipation area 4 and the refrigeration casing 6.

Preferably, the first heat dissipation holes 312, the second heat dissipation holes 321, and the third heat dissipation holes 42 are all horizontally oriented ventilation holes 13 to achieve horizontal ventilation and heat dissipation.

Figure 8:
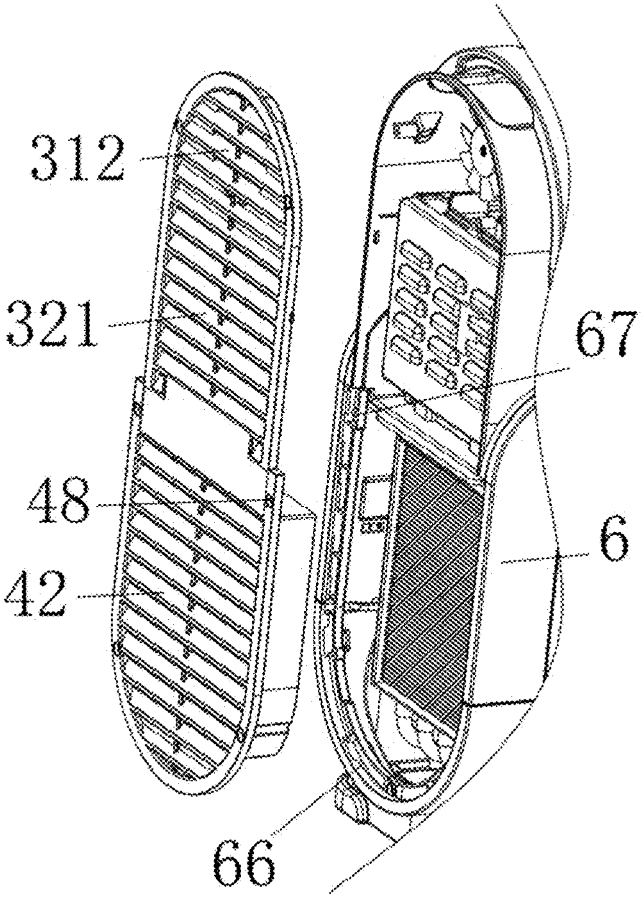
FIG. 8 is a structural diagram of the second embodiment of the heat dissipation mechanism of the disclosure.

As shown in FIG. 8, FIG. 8 shows a second embodiment of the heat dissipation mechanism of the present application. This embodiment differs from the first embodiment in that the outer shapes of the cover bodies of the two are different. In this embodiment, the first heat dissipation holes 312, the second heat dissipation holes 321, and the third heat dissipation holes 42 are all ventilation holes 13 inclined downward to achieve ventilation and heat dissipation in an inclined downward direction, and can also make it difficult for external impurities and moisture to enter the interior of the beverage cooler.

In this embodiment, the refrigeration heat dissipation area 4 is embedded in an installation groove 66 of the refrigeration casing 6 to serve as an installation positioning function. The periphery of the refrigeration heat dissipation area 4 is provided with a plurality of second bolt installation holes 48, and the peripheral side walls of the installation opening 63 are provided with second bolt installation portions 67 corresponding to the second bolt installation holes 48; bolts are passed through the second bolt installation holes 48 to be fixedly connected with the second bolt installation portions 67, thereby achieving a fixed connection between the refrigeration heat dissipation area 4 and the refrigeration casing 6.

The present application also provides a beverage cooler (not shown in the drawings) including the heat dissipation mechanism of any of the above embodiments. Since this beverage cooler comprises the heat dissipation mechanism of any of the above embodiments, the beverage cooler should also have the technical effects of the above embodiments, which will not be repeated here.

In summary, the present application provides heat dissipation areas in corresponding regions of the heat dissipation ventilation plate to achieve targeted heat dissipation for corresponding heating areas, without the need for excessive heat dissipation covers, and the heat dissipation structure is simple; it can also reduce the chances of external impurities and moisture entering the interior of the beverage cooler, improve the working stability of electrical components and circuits, and thus improve device stability.

Secondly, the present application provides a plurality of ventilation holes on the drive heat dissipation box, with the ventilation holes close to the drive board heat dissipation area; the ventilation holes can cool the drive board in the drive heat dissipation box, with excellent heat dissipation effects, which can prevent the drive board from affecting its stable operation due to high operating temperatures, thereby ensuring stable operation of the mixing work of the beverage cooler.

The above description is the preferred embodiment of the present utility model. It should be pointed out that for ordinary technicians in this technical field, several improvements and embellishments can still be made without departing from the principle of the present utility model, and these improvements and embellishments are also considered to be within the scope of protection of the present utility model.

What is claimed is:

1. A heat dissipation mechanism for a cold drink dispenser, comprising a driving heat dissipation box and a heat dissipation ventilation plate, wherein the heat dissipation ventilation plate is provided covering an opening at one end of the cold drink dispenser, the heat dissipation ventilation plate is provided with a driving heat dissipation area and a refrigerating heat dissipation area spaced apart from each other, the driving heat dissipation area is provided covering a motor base of the cold drink dispenser, the driving heat dissipation box is installed in the motor base;

the driving heat dissipation area comprises a driving motor heat dissipation area and a driving board heat dissipation area, the driving motor heat dissipation area is arranged in correspondence with a motor heat dissipation fan in the motor base, the driving board heat dissipation area is arranged in correspondence with the driving heat dissipation box;

a driving board is provided inside the driving heat dissipation box, one end of the driving heat dissipation box is provided with a wire passing hole, and a plurality of ventilation holes are spaced apart on the driving heat dissipation box, the ventilation holes is close to the driving board heat dissipation area;

the refrigerating heat dissipation area is provided covering on a refrigerating casing of the cold drink dispenser, the refrigerating heat dissipation area is arranged in correspondence with a condenser in the refrigerating casing, and a heat dissipation fan is disposed in the condenser.

2. The heat dissipation mechanism according to claim 1, wherein an inner wall of the driving motor heat dissipation area is provided with a first heat dissipation ventilation section, a plurality of first heat dissipation holes are provided in a region of the driving motor heat dissipation area corresponding to the first heat dissipation ventilation section;

the first heat dissipation ventilation section is close to the motor heat dissipation fan, the first heat dissipation ventilation section is provided with a first heat dissipation channel in communication with the first heat dissipation holes.

3. The heat dissipation mechanism according to claim 1, wherein the driving board heat dissipation area is provided with a plurality of second heat dissipation holes arranged in a matrix, the second heat dissipation holes being in communication with the ventilation holes.

4. The heat dissipation mechanism according to claim 1, wherein an inner wall of the refrigerating heat dissipation area is provided with a second heat dissipation ventilation section, a plurality of third heat dissipation holes are provided in a region of the refrigerating heat dissipation area corresponding to the second heat dissipation ventilation section;

the second heat dissipation ventilation section is close to or in abutment with the condenser, the second heat dissipation ventilation section is provided with a second heat dissipation channel, the second heat dissipation channel being in communication with the third heat dissipation holes.

5. A cold drink dispenser, comprising the heat dissipation mechanism according to claim 1.

6. The heat dissipation mechanism according to claim 1, wherein the driving heat dissipation box comprising a driving box body and a cover body covering the driving box body, a driving cavity is enclosed between the driving box body and the cover body; both sides of one end of the driving cavity are respectively provided with the wire passing holes, a plurality of the ventilation holes are spaced apart on the cover body, the ventilation holes are in communication with the driving cavity, the cover body and the ventilation holes being arranged in opposition to the driving board.

7. The heat dissipation mechanism according to claim 6, wherein the ventilation holes are arranged on the cover body in a matrix, with a space between adjacent two ventilation holes, the ventilation holes being an inverted L-shape.

8. The heat dissipation mechanism according to claim 1, wherein both sidewalls of the driving heat dissipation area are respectively provided with first elastic latch projections, both side of the inner walls of the motor base are respectively provided with first latch grooves, the first elastic latch projections being latched with the first latch grooves.

9. The heat dissipation mechanism according to claim 8, wherein a bottom of the refrigerating heat dissipation area is provided with a mounting notch, the mounting notch being mounted on a bottom plate of the refrigerating casing;

both sides of the inner walls of the refrigerating heat dissipation area are respectively provided with positioning flanges, both sides of the inner walls of a mounting opening of the refrigerating casing are respectively provided with positioning groove seats corresponding to the positioning flanges, the positioning flanges being fitted to the positioning groove seats;

both sides of the inner walls of the refrigerating heat dissipation area are respectively provided with a plurality of second elastic latch projections spaced apart, both sides of the inner walls of the mounting opening of the refrigerating casing are respectively provided with flange portions, the second elastic latch projections being used for abutting against the flange portions and latching into the mounting opening;

a plurality of first bolt mounting holes are provided at the perimeter edge of the refrigerating heat dissipation area, four side walls of the mounting opening being provided with first bolt mounting portions corresponding to the first bolt mounting holes.

10. The heat dissipation mechanism according to claim 9, wherein the refrigerating heat dissipation area is embedded in a mounting groove of the refrigerating casing, a plurality of second bolt mounting holes are provided at the perimeter edge of the refrigerating heat dissipation area, four side walls of the mounting opening being provided with second bolt mounting portions corresponding to the second bolt mounting holes.

* * * * *